United States Patent
Keijzer et al.

[11] 3,893,702
[45] July 8, 1975

[54] VEHICLE SUSPENSION SYSTEM

[76] Inventors: Johan H. Keijzer, 7 Septemberlaan 3, 3500 Hasselt; Gerry O. Maes, Terbiestweg, 29A, 3800 Sint-Truiden, both of Belgium

[22] Filed: May 2, 1974

[21] Appl. No.: 466,230

[52] U.S. Cl............................ 280/124 F; 267/64 B
[51] Int. Cl............................................. B60g 11/26
[58] Field of Search...... 280/124 F; 267/64 R, 64 B, 267/65 R

[56] References Cited
UNITED STATES PATENTS

| | | | |
|---|---|---|---|
| 2,997,291 | 8/1961 | Stultz | 267/64 R |
| 3,063,701 | 11/1962 | Long | 267/64 R |
| 3,104,119 | 9/1963 | Long | 267/64 B |
| 3,589,701 | 6/1971 | Gee | 267/64 R |
| 3,677,561 | 7/1972 | McNally | 280/124 F |
| 3,810,611 | 5/1974 | Ito | 267/64 R |
| 3,811,664 | 5/1974 | Spinks | 267/65 R |

*Primary Examiner*—Philip Goodman
*Assistant Examiner*—John A. Carroll

[57] ABSTRACT

A vehicle suspension system for use in operatively supporting the road engaging wheels on an automotive vehicle, the suspension including a pair of suspension struts each of which includes an elongated tubular pressure cylinder, a valved piston reciprocally disposed within the cylinder and connected to one end of a piston rod which extends axially from the cylinder, a rod guide disposed at one end of the pressure cylinder for supporting the piston rod for reciprocal movement, an elongated reserve tube arranged concentrically around the pressure cylinder, with one end of the reserve tube extending axially beyond the axially outer end of the rod guide and having the terminal end portion thereof deformed radially inwardly over the portion of the rod guide, a wheel spindle located at the opposite end of the strut from the rod guide and including a first portion fixedly secured to the outer periphery of the reserve tube and a second portion removably secured to the first portion and adapted to support a vehicle wheel thereon, and a helical coil spring extending around a portion of the strut and supported at one end by a spring support plate fixedly secured to the reserve tube.

18 Claims, 4 Drawing Figures

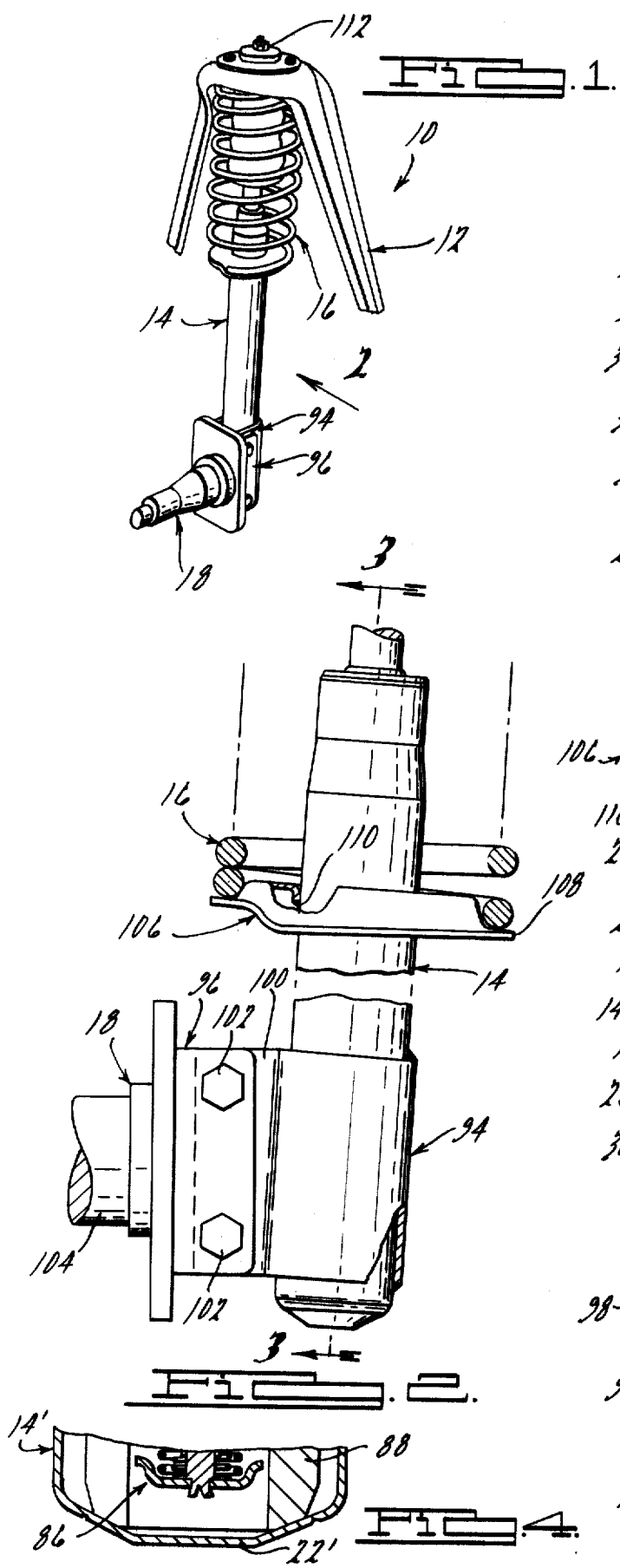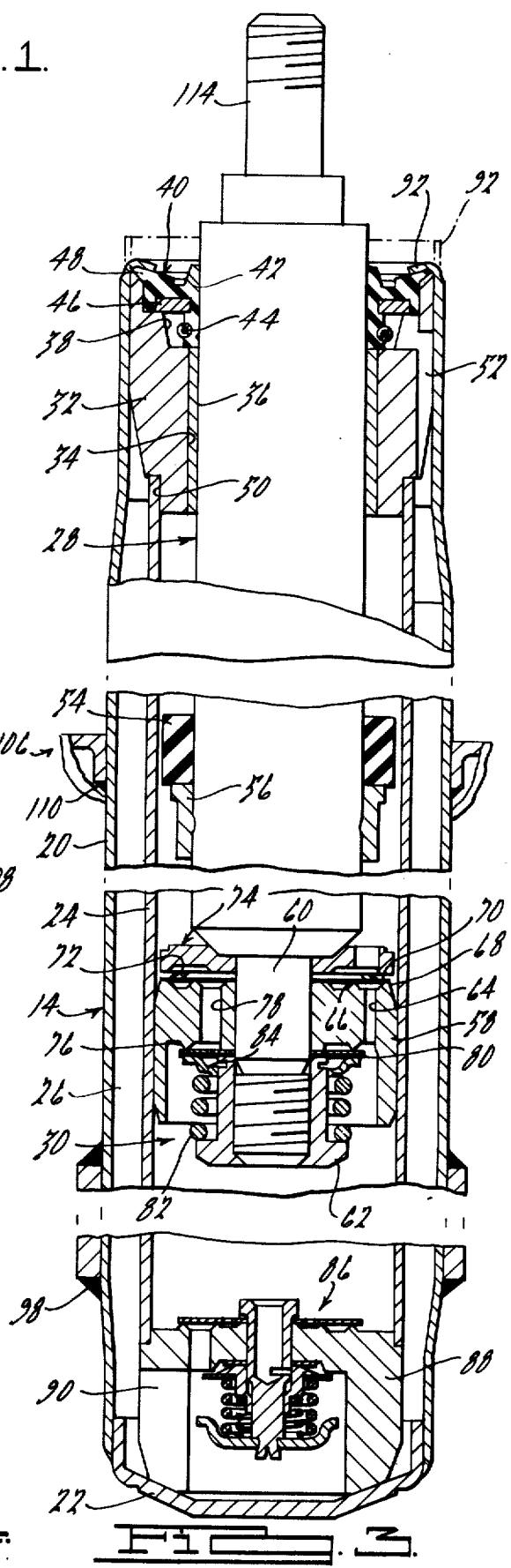

VEHICLE SUSPENSION SYSTEM

SUMMARY OF THE INVENTION

It has heretofore been the practice in vehicle suspensions of the MacPherson type to provide a removable shock absorber cartridge within an external housing, with the shock absorber cartridge being removably secured therein by means of a suitable threadably mounted ring nut which operatively engages the cartridge at the upper end thereof and positively retains the place within the housing. Typically, such housings were secured to the associated wheel spindle in a permanent manner, whereby if it was ever necessary to replace the shock absorber, only the cartridge itself would be disposed with.

Due to the increasing cost of labor and materials, the aforementioned type of construction has become objectionable from a cost standpoint in that expensive machining operations are necessary to form the threads in the upper end of the shock absorber cartridge receiving housing, as well as to produce the associated ring nut or similar threaded element. The present invention provides a new and improved suspension strut which obviates the above problems through the provision of a novel strut construction which eliminates the need for the shock absorber cartridge receiving housing as well as the machined retaining ring associated therewith. More particularly, the present invention provides a novel strut construction wherein the various components are retained within the strut housing by means of a spinning or crimping operation wherein the upper end of the strut housing is deformed radially inwardly to a position at least partially overlying the internal components within the housing. In addition, the strut construction of the present invention utilizes a wheel spindle design wherein the precision machined portion of the wheel spindle which is operatively associated with the wheel bearing may be removed from the strut when the same is being replaced and be reassembled on a new strut; thus, a significant cost savings is achieved as compared to a construction wherein the wheel spindle would have to be dispensed with entirely when the suspension strut itself was replaced.

It is accordingly a general object of the present invention to provide a new and improved vehicular suspension system.

It is a more particular object of the present invention to provide a new and improved suspension strut for vehicle suspension systems.

It is still a more particular object of the present invention to provide a new and improved suspension strut of the MacPherson type.

It is another object of the present invention to provide a new and improved MacPherson-type suspension strut wherein the outer housing has the upper end thereof deformed radially inwardly to retain the various component parts of the strut within the housing.

It is a related object of the present invention to provide a new and improved suspension strut of the above-described type which includes a wheel spindle having a first portion fixedly secured to the strut housing and a second portion detachably secured to the first portion.

It is another object of the present invention to provide a new and improved suspension strut of the above-described type which can be economically manufactured, easily replaced when necessary and which will have a long and effective operational life.

Other objects and advantages of the present invention will become apparent from the following detailed description taken in conjunction with the accompanying drawing.

BRIEF DESCRIPTION OF THE DRAWINGS

FIG. 1 is an elevated perspective view of one of the suspension struts incorporated in the suspension system of the present invention;

FIG. 2 is a side elevational view, partly broken away, of the suspension strut shown in FIG. 1, as seen in the direction of the arrow 2 thereof;

FIG. 3 is an enlarged fragmentary cross-sectional view taken substantially along the line 3—3 of FIG. 2; and FIG. 4 is a transverse cross-sectional view of the lower end of an alternate embodiment of the suspension strut of the present invention.

DETAILED DESCRIPTION OF THE PREFERRED EMBODIMENT

Referring now in detail to the drawing and in particular to FIG. 1 thereof, a vehicular suspension system, generally designated by the numeral 10, is shown in operative association with a portion of a vehicular frame 12 which normally supports the associated vehicle chassis, body, etc., as is well known in the art. The suspension system 10 includes at least two suspension struts, one of which is shown in FIG. 1 and is generally designated by the numeral 14. The strut 14 operates in conjunction with a helical coil spring 16 and a wheel spindle 18 for operatively supporting a vehicle road engaging wheel (not shown) of a type well known in the art upon the vehicle, with the spring 16 functioning to resiliently support the vehicle frame 12 relative to the wheel. Typically, the two suspension struts which might be utilized in a suspension system 10 of the present invention would consist of the front wheel struts for a vehicle. The present invention, however, is not intended to be limited only to the front suspension of a vehicle since it will find just as satisfactory application in connection with the vehicle's rear wheels.

Referring now in detail to the construction of the strut 14, as best seen in FIG. 3, said strut includes an elongated cylindrical housing or reserve tube 20 which is closed at the lower end thereof by means of a cup-shaped end cap member or the like 22. Disposed within the housing 20 and extending generally coaxially thereof is an elongated tubular pressure cylinder 24 that is spaced radially inwardly from the inner periphery of the housing 20 and defines a fluid reservoir or chamber 26 therewith. An elongated piston rod 28 extends coaxially within the pressure cylinder 24 and is adapted to support a piston assembly, generally designated by the numeral 30, on the lower end thereof. The piston rod 28 is mounted for reciprocal movement within the strut 14 by means of an annular rod guide 32 which is disposed adjacent the upper end of the cylinder 24. The rod guide 32 is formed with a central annular bore 34 within which a suitable anti-friction bushing or sleeve member 36 is disposed, the sleeve 36 serving to provide a wear-resistant sliding seal between the outer periphery of the piston rod 28 and the inner periphery of the rod guide 32. The upper end of the rod guide 32 is formed with an annular counterbore 38 within which an annular resilient wiping and sealing element 40 is disposed. As shown in FIG. 3, the element 40 includes an inner peripheral portion 42 adapted for wiping and sealing engagement with the outer periphery of the piston rod 28 and which is urged into sealing engagement with the piston rod by means of a suitable garter spring or the like 44. The element 40 is provided with a suitable reinforcing ring 46 and comprises a radially outwardly extending portion 48 which is retained in place by the upper end of the housing 20 in a manner hereinafter to be described. The lower end of the rod guide 32 is formed with an annular shoulder 50 against which the upper end of the presssure cylinder 24 is disposed, with suitable flow passages 52 being formed in the rod guide to communicate the upper end of the fluid reservoir 26 with the counterbore 38, whereby the pressure of the hydraulic fluid normally provided within the reservoir 26 will supplement the action of the garter spring 44 in urging the inner portion 42 of the sealing element 40 into positive sealing engagement with the outer periphery of the piston rod 28, as is well known in the art. A rebound bumper fabricated, for example, of a resilient deformable material such as rubber and generally designated by the numeral 54, is provided on the piston rod 28 adjacent the piston assembly 30, the assembly 54 being retained in place by means of an annular support ring 56 which is fixedly secured to the piston rod 28 directly below the assembly 54. The assembly 54 is adapted to operate in a manner well known in the art in preventing damage to the piston assembly 30 during the rebound cycle of the strut 14.

The piston assembly 30 comprises a generally cylindrically-shaped piston member 58 which is operatively supported on a reduced diameter lower end portion 60 of the piston rod 28 by means of a suitable retaining nut 62. The piston member 58 is provided with a plurality of circumferentially-spaced, radially outermost disposed set of longitudinally extending apertures or flow ports 64 which are located between a pair of radially spaced, concentric valve seats 66 and 68 that are provided on the upper end of the member 58. Valve seats 66, 68 are cooperable with and adapted to be engaged by a relatively thin, washer-like valve element 70 which functions to close the upper ends of the apertures 64 when the piston rod 28 moves upwardly within the pressure cylinder 24. A spring disc 72 is disposed directly above the valve element 70 and is adapted to resiliently urge the latter toward the valve seats 66, 68. A support washer 74 is disposed directly above the disc 72 for securing the elements 70, 72 in place.

Another valve seat 76 is provided on the lower end of the piston member 58 at a position radially outwardly from a plurality of circumferentially spaced, longitudinally extending inner set of apertures 78 and is adapted to be engaged by a thin washer-like valve disc 80 which is urged against the valve seat 76 by means of a helical coil spring 82, the upper end of which bears against a spring seat 84 and the lower end of which bears against the nut 62. It will be seen that when the piston assembly 40 moves upwardly within the pressure cylinder 24, fluid under pressure will move downwardly through the apertures 78, thereby unseating the valve disc 80 and permitting fluid to pass into the area below the piston assembly 30. Conversely, when the piston assembly 30 moves downwardly within the pressure cylinder 24, the valve disc 70 will move upwardly away from the valve seats 66, 68 to permit fluid to move into the upper end of the pressure cylinder 24 through the plurality of flow passages 64, as will be appreciated by those skilled in the art.

Disposed adjacent the lower end of the pressure cylinder 24 is a compression or base valve assembly, generally designated by the numeral 86, which comprises a cylindrical end or base member 88 that is of a generally cup-shaped configuration and is provided with flow ports 90 which are communicable with the lower end of the fluid reservoir 26. A detailed description of the construction and operation of the base valve 86 is provided in U.S. Pat. application Ser. No. 370,021 filed June 14, 1973, which is incorporated by reference herein in the descriptive portion of the specification. The base valve 86 generally functions to compensate for the volume of the piston rod 28 as the rod 28 moves downwardly within the pressure cylinder 24. More particularly, the base valve 86 functions to control the flow of hydraulic fluid between the lower end of the pressure cylinder 24 and the reservoir 26; however, for purposes of conciseness of description, a detailed description of the construction and operation of the valve assembly 86 will be omitted since a full understanding thereof may be achieved with reference to the aforementioned copending patent application, Ser. No. 370,021.

In accordance with one of the principles of the present invention, the upper end of the housing or reserve tube 20 is formed with a reduced thickness terminal end portion 92 which, prior to final assembly of the internal components of the strut 14, assumes a generally axially outwardly extending shape, as seen by the phantom lines in FIG. 3. After the various components within the housing 20 have been assembled thereinto, the outer housing 20 is subjected to a spinning or crimping operation, whereby the end portion 92 is deformed radially inwardly and slightly downwardly, as seen by the solid line position of the portion 92 in FIG. 3. As illustrated in FIG. 3, the radially innermost part of the portion 92 overlies the outer peripheral portion 48 of the seal 40 and clampingly engages the same with the upper end of the rod guide 32. Accordingly, the various internal components within the strut 14 are positively retained therein by the crimped or spun-over housing portion 92.

In accordance with another feature of the present invention, the wheel spindle 18 consists of a first part or section 94 which is fixedly secured to the strut 14 and a second part or section 96 which is removably secured to the section 94. More particularly, the wheel spindle section 94 is of a generally sleeve-shaped configuration and extends around the outer periphery of the housing 20 and is fixedly secured thereto as by welding, as seen in 98 in FIG. 3. The section 94 includes a radially outwardly extending portion 100 which is adapted to be connected by suitable screws, bolts or similar threaded fastening means 102 to the wheel spindle section 96. As is conventional in the art, the section 96 includes a machined spindle portion 104 which is adapted to receive the associated wheel bearing that functions to support the associated road engaging wheel (not shown) of the vehicle.

The suspension strut 14 is provided with a generally radially outwardly extending spring support plate, generally designated 106, that includes a radially outwardly extending flange portion 108 upon which the lower end of the coil spring 16 is supported. The inner periphery of the plate 106 is secured as by welding 110 to the outer periphery of the housing 20 in the manner best seen in FIGS. 2 and 3. The upper end of the spring 16 is adapted to bear against a similar type plate (not shown) which in turn acts against the associated frame or chassis portion 12, whereby the associated chassis is spring supported upon the coil spring 16, in a manner well known in the art.

At such time as it is desired to replace the suspension strut 14, the coil spring 16 is suitably compressed to relieve the spring force exerted thereby against the chassis portion 12 and the attachment nut 112 threadably received upon the reduced diameter upper end portion 114 of the piston rod 28 is removed, thereby permitting removal of the strut 14. The fastening bolts 102 are then removed to permit separation of the wheel spindle section 104 from the strut 14, after which time the strut 14 can be discarded and the wheel spindle section 104 may be then secured by means of the fastening bolts 102 to a new strut 14. Thereafter, the spring 16 may be mounted around the new strut 14 and the upper end portion 114 of the piston rod 28 thereof may be secured by means of the nut 112 to the chassis 12.

FIG. 4 illustrates a slightly modified embodiment of the strut 14 wherein the lower end of the housing 20 is formed with an integral bottom section 22'. More particularly, the strut shown in FIG. 4 is designated by the numeral 14' and is intended to be identical in construction and operation to the aforedescribed strut 14 with the exception that the end cap 22 incorporated therein is replaced by the integral bottom portion 22'. Preferably, although not necessarily, the bottom portion 22' is formed by means of a spinning operation of the type well known in the art and which obviates the need for welding or otherwise securing a separately manufactured component, i.e. end cap 22, to the housing 20.

I claim:

1. A vehicle suspension system for use in operatively supporting the road engaging wheels on an automotive vehicle, said suspension including at least one suspension strut comprising an elongated tubular pressure cylinder, a valved piston reciprocably disposed in said cylinder and connected to one end of a piston rod extending axially from one end of said cylinder, attachment means operatively securing one end of said piston rod to a sprung portion of the associated vehicle, a rod guide assembly disposed at one end of said pressure cylinder for supporting said piston rod for reciprocal movement relative to said cylinder, said assembly including a rod guide member defining a central bore within which said piston rod is reciprocally disposed, the outer end of said bore being formed with a counterbore defining an axially upwardly projecting annular flange and an annular recess extending around said piston rod, an annular sealing element disposed within said recess adapted to slidably and sealingly engage the outer periphery of said piston rod, an elongated reserve tube extending concentrically around said pressure cylinder, said reserve tube being spaced radially outwardly from said pressure cylinder and defining a fluid reservoir therewith, a base valve located at the opposite end of said pressure cylinder from said rod guide and operable to control fluid flow between the interior of said pressure cylinder and said reservoir, a wheel spindle located adjacent one end of said strut and including a first portion fixedly secured to the outer periphery of said reserve tube and a second portion removably secured to said first portion and adapted to support a vehicle wheel thereon, the inner periphery of the end of said reserve tube adjacent said rod guide assembly being of substantially the same size as the outer periphery of said upwardly projecting annular flange and extending axially beyond the axially outer end of said flange, with the terminal portion thereof being deformed radially inwardly over at least a portion of the axially outer end of said flange, and a helical coil spring extending around at least a portion of said strut and supported at one end by a spring support plate fixedly secured to said reserve tube, with the opposite end of said spring acting against the associated sprung portion of the vehicle.

2. The invention as set forth in claim 1 which includes removable fastening means for permitting disassembly of said second portion of said wheel spindle from said first portion thereof.

3. The invention as set forth in claim 2 wherein said first portion of said wheel spindle extends around the outer periphery of said reserve tube and is fixedly secured thereto by welding.

4. The invention as set forth in claim 3 wherein said removable fastening means comprises threaded fastening means.

5. The invention as set forth in claim 1 wherein said terminal portion of said reserve tube extends radially inwardly over both the axially outer end of said flange and at least a portion of said sealing element for securing said element in its operative position within said recess.

6. The invention as set forth in claim 1 wherein said vehicle suspension comprises a pair of said struts.

7. The invention as set forth in claim 6 wherein said pair of struts are operatively disposed adjacent the front end of the vehicle and are adapted to operatively support the front wheels thereof.

8. The invention as set forth in claim 1 wherein the lower end of said reserve tube is formed with an integral spun-over lower end portion.

9. A vehicle suspension system for use in operatively supporting the road engaging wheels on an automotive vehicle, said suspension including at least one suspension strut comprising an elongated tubular pressure cylinder, a valved piston reciprocably disposed in said cylinder and connected to one end of a piston rod extending axially from one end of said cylinder, attachment means operatively securing one end of said piston rod to a sprung portion of the associated vehicle, a rod guide disposed at one end of said pressure cylinder for supporting said piston rod for reciprocal movement relative to said cylinder, an elongated reserve tube extending concentrically around said pressure cylinder, said reserve tube being spaced radially outwardly from said pressure cylinder and defining a fluid reservoir therewith, a base valve located at the opposite end of said pressure cylinder from said rod guide and operable to control fluid flow between the interior of said pressure cylinder and said reservoir, a wheel spindle assembly located adjacent the opposite end of said strut from said rod guide, and including first and second members, said first wheel spindle assembly member defining a recess having said opposite end of said strut received therein and having a connection portion extending outwardly therefrom, said second assembly member comprising a spindle portion adapted to have a vehicle wheel rotatably mounted thereon and a connecting portion cooperable with said connecting portion of said first member, and fastening means for securing said connecting portions and hence first and second spindle members together, the end of said reserve tube adjacent said rod guide extending axially beyond the axially outer end of said guide, with the terminal portion thereof being deformed radially inwardly over at least a portion of the axially outer side of said guide, and a helical coil spring extending around at least a portion of said strut and supported at one end by a spring support plate fixedly secured to said reserve tube, with the opposite end of said spring acting against the associated sprung portion of the vehicle.

10. The invention as set forth in claim 9 wherein said fastening means is removable for permitting disassembly of said first and second wheel spindle members.

11. The invention as set forth in claim 9 wherein said recess in said first spindle member comprises an annular bore, and wherein said opposite end of said strut extends into said bore.

12. The invention as set forth in claim 10 wherein said removable fastening means comprises threaded fastening means.

13. The invention as set forth in claim 9 which includes fluid seal means disposed on the axially outer side of said rod guide and adapted for sliding sealing engagement with the outer periphery of said piston rod.

14. The invention as set forth in claim 13 wherein said terminal portion of said reserve tube extends radially over at least a portion of said seal for securing said seal in its operative position upon the axially outer side of said rod guide.

15. The invention as set forth in claim 9 wherein said vehicle suspension comprises a pair of said struts.

16. The invention as set forth in claim 15 wherein said pair of struts are operatively disposed adjacent the front end of the vehicle and are adapted to operatively support the front wheels thereof.

17. The invention as set forth in claim 9 wherein the lower end of said reserve tube is formed with an integral spun-over lower end portion.

18. The invention as set forth in claim 9 wherein said rod guide defines a central bore within which said piston rod is reciprocally disposed, the outer end of said bore being formed with a counterbore defining an axially upwardly projecting annular flange and an annular recess extending around said piston rod, an annular sealing element disposed within said recess adapted to slidably and sealingly engage the outer periphery of said piston rod and wherein the axially outer end of said reserve tube is spun radially inwardly over the axially outer end of said flange.

* * * * *

UNITED STATES PATENT OFFICE
CERTIFICATE OF CORRECTION

PATENT NO. : 3,893,702
DATED : July 8, 1975
INVENTOR(S) : Johan H. Keijzer and Gery O. Maes It is certified that error appears in the above-identified patent and that said Letters Patent are hereby corrected as shown below:

Column 4, line 54, "in" should be --at--. Column 5, after line 36, insert the following paragraph --While it will be apparent that the preferred embodiment of the invention disclosed is well calculated to fulfill the objects above stated, it will be appreciated that the invention is susceptible to modification, variation and change without departing from the proper scope or fair meaning of the subjoined claims.--

Signed and Sealed this thirtieth Day of March 1976

[SEAL]

Attest:

RUTH C. MASON
Attesting Officer

C. MARSHALL DANN
Commissioner of Patents and Trademarks